Oct. 25, 1966    W. M. JAMESON    3,281,296

METHOD FOR EDGE SEALING SAFETY GLASS
Filed April 8, 1963

INVENTOR.
WILLIAM M. JAMESON
BY
*Owen P Owen*
ATTORNEYS

United States Patent Office 3,281,296
Patented Oct. 25, 1966

3,281,296
METHOD FOR EDGE SEALING SAFETY GLASS
William M. Jameson, Sandusky, Ohio, assignor to Permaglass, Inc., Woodville, Ohio, a corporation of Ohio
Filed Apr. 8, 1963, Ser. No. 271,181
4 Claims. (Cl. 156—104)

The present invention relates to laminated glass sheets, often called "safety glass," and more particularly to a method of producing the same.

Laminated safety glass of the type used in automobile windshields comprises a sheet of plastic placed between two sheets of glass to form a sandwich. The air is evacuated from between the sheets of glass and the plastic is melted to bond the layers of glass together. Where curved layers of glass are to be bonded together, a fluid pressure must be used to force the layers together during the bonding operation.

In one prior art process, the sandwich comprising the layers of glass and the intermediate plastic layer is sealed in a bag, the bag is evacuated, and the bag is subjected to heat and fluid pressure to bond the sandwich together.

In other prior art processes a sealing strip, gasket, or tire is placed around the edge of the sandwich, the tire is evacuated, and the assembly is subjected to a temperature above the softening point of the plastic to seal the periphery of the sandwich together. Evacuation of air from the tire during the sealing step causes the edges of the layers of glass to be bowed inwardly slightly and, consequently, it is necessary to remove the tire and reheat the sandwich under pressure to allow the edges of the glass to straighten out and relieve the stresses. This reheating step is usually accomplished by placing the entire sandwich in an autoclave under direct fluid pressure. Because air under pressure tends to penetrate between the layers of glass to a greater extent than a liquid, all commercial processes with which I am familiar subject the sandwich to direct contact with oil under pressure in the autoclave.

To help prevent penetration of oil between the layers of glass, in one prior art process the edges of the sandwich are coated with a sealing material. This material must be removed from the sandwich after the sandwich is removed from the autoclave. Even so, oil penetrates between the interfaces of the glass and plastic in a sizable percentage of the sandwiches subjected to direct oil pressure, and consequently, a considerable amount of scrap is produced.

In addition, where the sandwiches are stress-relieved by immersion in oil under pressure so that they are wetted by the oil, the sandwiches also must be washed to remove the oil and then dried. The washing and drying equipment used is expensive and costly to maintain, and involves the expenditure of a considerable amount of labor to operate.

An object of the present invention is the provision of a new and improved method of producing a seal around the periphery of a sandwich for a laminated glass object which seal is so complete that the stress relieving operation can be carried out under air pressure.

Another object of the invention is the provision of a new and improved method of producing safety glass in which the fluid which is used to compress the sandwich together is compressed air instead of an oil under pressure, so that the step of removing oil from the surfaces of the glass is eliminated.

Further objects and advantages of the invention will become apparent to those skilled in the art from the preferred embodiment described with reference to the accompanying drawing forming a part of this specification, and in which.

Figure 1:
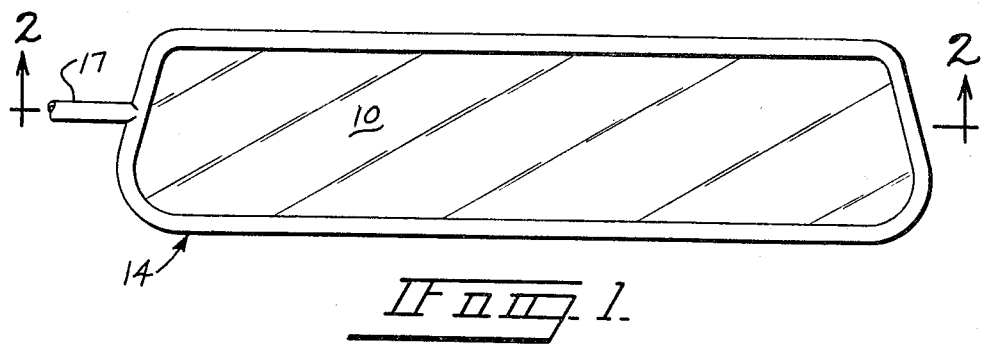
FIG. 1 is a plan view of a laminated glass sandwich assembly having a vacuum apparatus installed on the periphery thereof in order to remove air from between the laminations in accordance with the invention.
Figure 2:
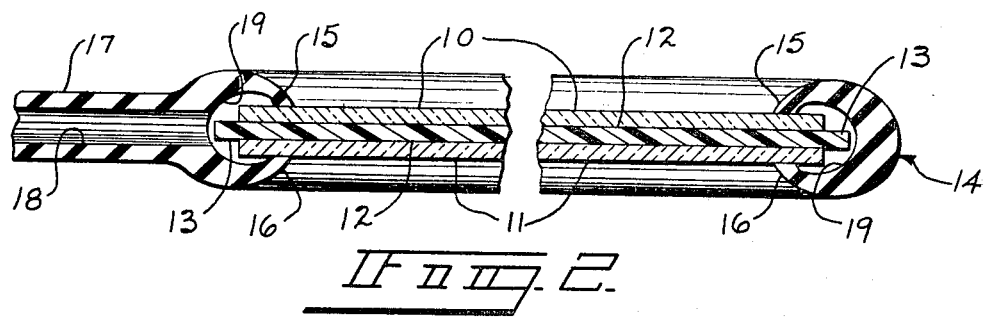
FIG. 2 is a fragmentary cross sectional view taken along the line 2—2 of FIG. 1.

In carrying out the process of the present invention, two sheets of glass 10 and 11 are cut to the proper size. If the laminate is to have a bent shape, as for an automobile windshield, the sheets 10 and 11 are stacked together and placed upon a curved form. The form with the sheets of glass 10 and 11 thereon is placed in a furnace and gradually heated until the glass sags to the contour of the form. The curved glass sheets 10 and 11 are then removed from the furnace and cooled down to room temperature. The two sheets of glass 10 and 11, whether curved as a result of this preliminary bending step, or flat, as for a side window of an automobile, and as illustrated in the drawings, are assembled into a sandwich with a sheet of polyvinyl butyral plastic 12 inserted therebetween. The plastic is stretched so that no wrinkles exist, and the plastic sheet 12 is then trimmed, leaving a projection 13 of approximately 1/8" to approximately 3/8" and preferably one-fourth of an inch wide projecting beyond the edges of the sheets of glass 10 and 11.

A sealing strip or tire 14, which is shaped to correspond to the periphery of the layers of glass 10 and 11, is placed around the periphery of the sandwich. The tire 14 has a C-shaped cross section which forms two lips 15 and 16 which closely approach each other and which are adapted to seal against the opposite outside surfaces of the two layers of glass 10 and 11 of the sandwich. The tire 14 may be made from any flexible material such as an elastomeric material, and is usually made from rubber.

The tire 14 includes a vacuum connection line 17 which has an opening 18 therein which communicates with an inside cavity 19 of the tire 14. After the tire 14 is installed on the periphery of the sandwich the assembly is placed in an air autoclave. The temperature in the autoclave is gradually raised to a temperature above the melting point of the plastic in the sheet 12 while vacuum is applied to the tire 14. Because polyvinyl butyral has a softening temperature of approximately 234° F. the temperature in the autoclave should be above 234° F. and preferably not exceeding about 290° F. A temperature of approximately 265° F. gives excellent results.

Figures 3, 4:
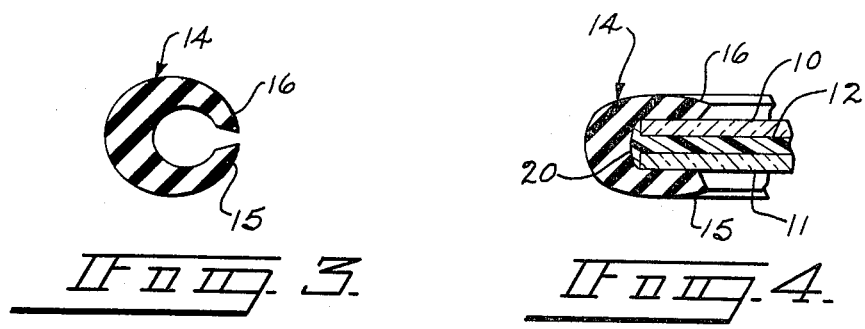
FIG. 3 is a detailed view in cross section of the vacuum apparatus before being installed on a laminated glass assembly.
FIG. 4 is a view similar to FIG. 3 but showing the vacuum apparatus in place on a sandwich during the application of vacuum thereto.

As illustrated in FIG. 4, at these elevated temperatures the plastic in the sheet 12 is softened and the projection 13 is squeezed in against the side edges of the glass sheets 10 and 11 forming a bead 20 which extends over the cracks therebetween. After the desired temperature is achieved, air under pressure is fed into the autoclave. While any suitable pressure can be used to force the layers together, it has been found that 150 p.s.i. air pressure gives the best results.

This pressure and temperature is held for a short period of time, which may be from three to ten minutes, following which the temperature in the autoclave is reduced to well below the softening point of the plastic in the sheet 12. Thereafter the pressure is reduced and the autoclave opened. Vacuum is removed from the tire 14 and the tire 14 removed from sealing relationship with the sandwich.

The above described operation seals the layers of glass 10 and 11 together and at the same time softens and forces the ¼″ projection 13 of the plastic material up against the sides of the layers of glass to form the bead 20 and cover and seal the crack therebetween.

Because the tire 14 squeezes the edges of the layers of glass 10 and 11 together with greater force than occurs in the center region, the edges of the layers of glass 10 and 11 tend to be bent towards each other slightly. It is necessary to release this stress and so the sandwich is put back into the autoclave and the temperature and pressure therein are raised again to the levels previously used. Air under pressure is fed into the autoclave until a pressure of approximately 150 p.s.i. is reached. At the same time the temperature is raised gradually until it reaches 265° F. Because the tire 14 is not present in this step air pressure is exerted directly against the surfaces of the glass, including their edges, but because of the bead 20 of plastic over the cracks between the layers of glass 10 and 11, the air cannot enter between the layers. After the sandwich is held at this temperature and pressure for a short length of time, the temperature is reduced gradually to below the softening point of the plastic and thereafter the pressure is gradually reduced to atmospheric pressure and the unit is removed from the autoclave. It has been found that the bead of plastic 20 which is formed around the edges is so effective that substantially 100 percent of the units are adequately sealed.

It will be apparent that the objects heretofore enumerated as well as others have been accomplished, and that there has been provided a new and improved process for producing laminated glass in which a surplusage of the plastic that is used between the layers of glass is provided around the outside edge of the layers of glass. This surplus of plastic is heated and compressed into a bead which overlies the cracks between the layers of glass to completely seal off these cracks even against air pressure. As a further advantage the sandwiches are sealed together in a dry autoclave using air pressure so that the glass does not have to be washed clean of oil.

While the invention has been described in considerable detail, I do not wish to be limited to the particular embodiment of the process above described and it is my intention to cover hereby all novel adaptations, modifications and arrangements thereof which come within the practice of those skilled in the art to which the invention relates.

What I claim is:

1. The method of forming laminated safety glass comprising, in combination, assembling into a sandwich two sheets of glass of substantially the same size and shape so that the edges of said sheets are in registry and an intermediate sheet of thermoplastic resinous material with the edges of said resinous sheet projecting outwardly beyond the edges of said glass sheets approximately ⅛ to approximately ⅜ of an inch, embracing the edges of said sandwich with a hollow tire of an elastomeric material extending around the entire periphery of said three sheets to seal off the peripheral edge of said sandwich, subjecting the interior of said tire to a vacuum for removing air therefrom and from between said three sheets, raising the temperature of the assembly to one sufficiently high to soften the resinous material while subjecting the tire to vacuum to collapse said tire inwardly against the peripheral edge of said three sheets to deform the projection of said resinous sheet into a bead against the edges of said sheets of glass and covering the cracks therebetween, and cooling the assembly below the softening point of the resinous material while maintaining vacuum in said tire.

2. The method of forming laminated safety glass comprising, in combination, assembling into a sandwich two sheets of glass substantially the same size and shape so that the edges of said sheets are in registry and an intermediate sheet of thermoplastic resinous material with the edges of said resinous sheet projecting outwardly beyond the edges of said glass sheets approximately ⅛ to approximately ⅜ of an inch, embracing the edges of said sandwich with a hollow tire of an elastomeric material extending around the entire periphery of said three sheets to seal off the peripheral edge of said sandwich, subjecting the interior of said tire to a vacuum for removing air therefrom and from between said three sheets, raising the temperature of the assembly to one sufficiently high to soften the resinous material while subjecting the tire to vacuum to collapse said tire inwardly against the peripheral edge of said three sheets to deform the projection of said resinous sheet into a bead against the edges of said sheets of glass and covering the cracks therebetween, subjecting the assembly to elevated pressures, cooling the assembly below the softening point of the resinous material while maintaining pressure on the assembly, removing the pressure from said assembly, unsealing said tire, and subjecting said assembly including its edge portions to an elevated pressure and a temperature above the softening point of the plastic for relieving stresses in said glass sheets.

3. The method of forming laminated safety glass comprising, in combination, assembling into a sandwich two sheets of glass of substantially the same size and shape so that the edges of said sheets are in registry and an intermediate sheet of thermoplastic resinous material with the edges of said resinous sheet projecting outwardly beyond the edges of said glass sheets approximately ¼ of an inch, embracing the edges of said sandwich with a hollow tire of an elastomeric material extending around the entire periphery of said three sheets to seal off the peripheral edge of said sandwich, subjecting the interior of said tire to a vacuum for removing air therefrom and from between said three sheets, placing the assembly into an air autoclave and raising the temperature in the autoclave to one sufficiently high to soften the resinous material while subjecting the tire to vacuum to collapse said tire inwardly against the peripheral edge of said three sheets to deform the projection of said resinous sheet into a bead against the edges of said sheets of glass and covering the cracks therebetween, raising the pressure in the autoclave while maintaining vacuum within the tire, cooling the autoclave below the softening point of the resinous material while air pressure is maintained in the autoclave, removing the pressure from the autoclave and unsealing the tire, and raising the air pressure in the autoclave and also raising its temperature to a temperature above the softening point of the resinous material.

4. The method of forming laminated safety glass comprising, in combination, assembling into a sandwich two sheets of glass of substantially the same size and shape so that the edges of said sheets are in registry and an intermediate sheet of thermoplastic resinous material with the edges of said resinous sheet projecting outwardly beyond the edges of said glass sheets a distance sufficient that the protruding portion of said sheet of resinous material is enough to form a closure overlapping the inner margins of the edges of said sheets of glass, embracing the edges of said sandwich with a hollow tire of an elastomeric material extending around the entire periphery of said three sheets to seal off the peripheral edge of said sandwich, subjecting the interior of said tire to a vacuum for removing air therefrom and from between said three sheets, raising the temperature of the assembly to one sufficiently high to soften the resinous material while subjecting the tire to vacuum to collapse said tire inwardly against the peripheral edge of said three sheets to deform the projection of said resinous sheet into a bead against the edges of said sheets of glass and covering the cracks therebetween, and cooling the assembly below the softening point of the resinous material while maintaining vacuum in said tire.

References Cited by the Examiner
UNITED STATES PATENTS
2,948,645  8/1960  Keim _____ 156—104

ALEXANDER WYMAN, *Primary Examiner.*

W. J. VANBALEN, *Assistant Examiner.*